(No Model.) 3 Sheets—Sheet 1.
J. H. BARRINGER.
SELF LOADING CART.
No. 319,876. Patented June 9, 1885.
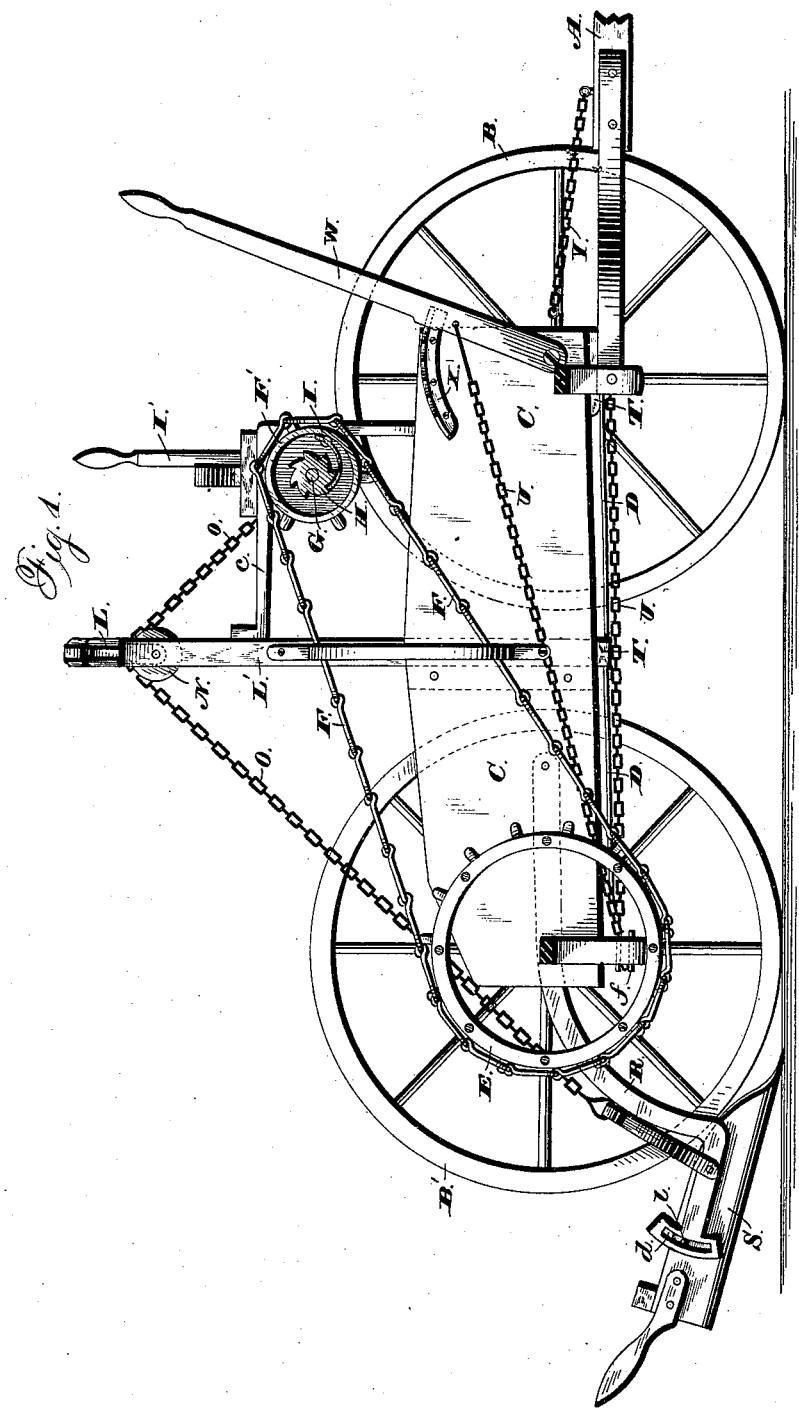
WITNESSES
Jas. E. Hutchinson.
George F. Downing
INVENTOR
John H. Barringer.
Attorney (No Model.) 3 Sheets—Sheet 2.
J. H. BARRINGER.
SELF LOADING CART.
No. 319,876. Patented June 9, 1885.
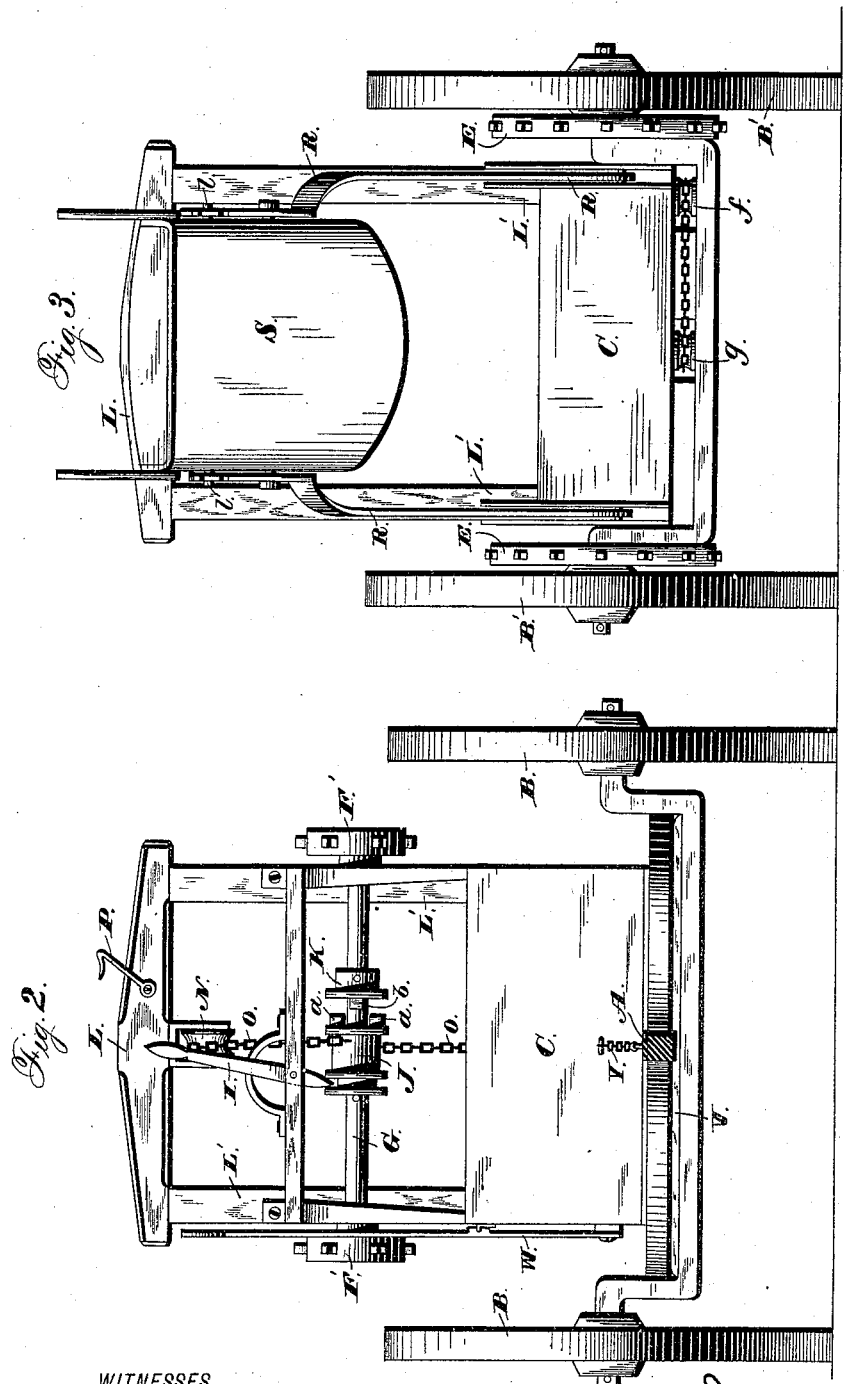

(No Model.) 3 Sheets—Sheet 3.
J. H. BARRINGER.
SELF LOADING CART.
No. 319,876. Patented June 9, 1885.
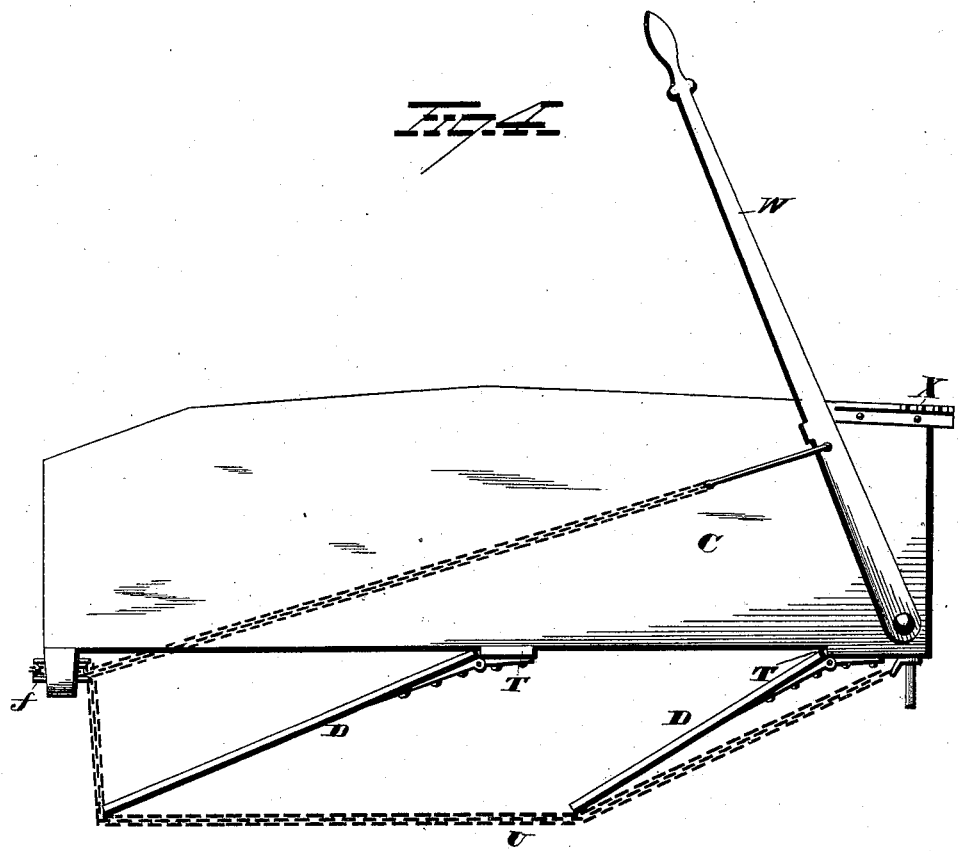
WITNESSES
S. G. Nottingham
Geo. F. Downing
INVENTOR
J H Barringer
By H A Supmon
Attorney

UNITED STATES PATENT OFFICE.

JOHN H. BARRINGER, OF LINCOLN, NEBRASKA.

SELF-LOADING CART.

SPECIFICATION forming part of Letters Patent No. 319,876, dated June 9, 1885.

Application filed June 19, 1882. Renewed November 10, 1884. (No model.)

*To all whom it may concern:*

Be it known that I, JOHN H. BARRINGER, of Lincoln, in the county of Lancaster and State of Nebraska, have invented certain new and useful Improvements in Self-Loading Carts; and I do hereby declare the following to be a full, clear, and exact description of the invention, such as will enable others skilled in the art to which it pertains to make and use the same.

My invention relates to an improvement in excavators, the object of the same being to provide a wagon or cart with an excavating or scraping attachment pivotally secured at the rear end thereof, the latter adapted to be elevated at will as the vehicle moves forward, so as to deposit the load into the wagon or cart body; and with these ends in view my invention consists in the parts and combination of parts, as will be more fully described, and pointed out in the claims.

In the aaccompanying drawings, Figure 1 is a side view of my improved device, the wheels on one side of the wagon being removed. Fig. 2 is a front view of the same; and Fig. 3, a rear view. Fig. 4 is a view showing the sectional bottom.

In the drawings I have shown, and in the specification will describe, a four-wheel vehicle, which is intended to be drawn by four horses, and where large loads are required to be carried long distances; but my improvements are equally well applicable to two-wheeled carts drawn by one or two horses, as necessity demands, the construction of the operative parts being the same in both instances.

A represents the draft-tongue; B, the front wheels; B', the rear or drive wheels, and C the box, which latter is provided with the sectional bottom D, which will hereinafter be more particularly referred to. The rear or drive wheels, B', are provided on their inner faces with the rigid spur or sprocket wheels E, around which the drive-chains F pass. These drive-chains F on opposite sides of the machine pass around the small spur or sprocket wheels F', loosely secured to the ends of the drive-shaft G, and as the wheels B' move forward and backward the sprocket-wheels F' also revolve simultaneously in the same direction. The outer ends of the drive-shaft G are each provided with ratchet-wheels H, rigidly secured to the said shaft, while each sprocket wheel F' is provided with a spring-actuated pawl, I, which engage the sprocket-wheels. These parts are so placed and constructed that when the machine moves forward the pawl engages the ratchet and turns the drive-shaft, but when backing the pawl passes the teeth of the ratchet-wheel without engaging therewith, and, consequently, enables the shaft to remain stationary. This shaft G is suitably journaled on the under side of the driver's seat, so as to be out of the way, and yet be within easy reach of the driver, who controls the operation of the scraper by means of the lever I, which latter projects up through and is pivotally secured to the driver's seat. The lower end of this lever I is secured to the winding-drum J, which latter is loosely secured on the main-shaft G. This drum J is provided with side lugs, *a*, adapted, when moved longitudinally to one side, to engage the corresponding lugs, *b*, of the clutch K, which latter is rigidly secured to the shaft G. Thus it will be seen that the shaft G constantly revolves as the machine is moved forward, but by the clutch mechanism last described the winding-drum J only revolves when it is in engagement with the clutch, and when it is desired to elevate the scraper.

L is a cross-beam supported on the upright standards L', the latter being secured to the machine-body and strengthened by the seat braces or supports *c*. A pulley, N, is secured to the under side of the cross-beam L, and serves as a guide and support for the lifting-chain O, one end of which latter is secured to the winding-drum J, while the opposite end thereof is secured to the bail of the scraper.

P is a hook secured to the front face of the cross-bar L, and adapted to engage a link of the chain and hold the scraper elevated above the machine while moving from place to place. The scraper S is pivotally secured to the body of the machine at the rear thereof, and is adapted to engage the ground and operate while in this position like any ordinary scraper. This scraper is attached to the machine by the crooked arms R, the front sides of which are pivotally secured to the sides of the body, while the scraper is pivotally secured to the said arms near their rear ends. These arms R are T-shaped at their rear ends, and are each provided with an oblong slot, $d$, in which the pins $e$, secured to the scraper S, move. This construction allows the scraper to dip at its front end sufficiently to engage the ground, and, when filled, to be tipped backward sufficiently to retain the earth therein until the scraper S has been elevated sufficiently to enable the contents thereof to be emptied into the machine-body.

Instead of the above construction, the ends of the arms R can be provided with the pins and the sides of the scraper S with the slots, and answer all the necessary purposes.

When the machine is moving forward, a person can take hold of the handles of the scraper S and slightly elevate them, which causes the point of the scraper to enter the earth and fill the scraper easily and quickly. As soon as the scraper is filled, the driver, by means of the lever before referred to, moves the drum into engagement with the clutch and winds the chain thereon. As the chain winds on the drum the scraper is being elevated and at all times held in a level position by the operator at the handles. When the scraper has been elevated sufficiently, the contents thereof are deposited into the machine-body by simply tilting the scraper.

From the foregoing it will be seen that the scraper can be filled and elevated by the same team and machinery as often as is necessary to take any kind of a load that can be drawn by the team.

As before stated, the bottom of the machine-body is made up of sections, each section being hinged at its front end to the cross-bars T, and adapted to be lowered or inclined so as to quickly discharge the contents of the machine-body. The sections are held up in a closed position by the chain U, the front end of the latter being secured to the bolster V. This chain then runs backward under the center of each section, passes partly around the pulley $f$, over to the pulley $g$, and then forward along the side of the body to the lever W. This lever W is pivoted to the machine-body within easy reach of the driver, and is adapted to engage the segment-rack X, so as to hold the chain taut. When the chain is drawn taut, it presses or lifts the sections composing the bottom up to their proper positions, and when the chain is slacked it allows the weight of the material in the machine-body to force the said sections downward and form discharge-openings, through which the contained material passes. These sections are pivoted at their front ends, so as not to engage the ground and interfere with the forward movement of the machine.

Y is a chain connected directly at one end to the body of the machine, while the opposite end thereof is secured to the double-tree, so that the strain shall pass directly to the body of the machine, and not through the small king-bolt, which, when of ordinary construction, would be insufficient for the present purpose.

In the rear part of the machine-body, where the arms R are connected thereto, double side-boards are provided, between which these arms are pivotally secured. This construction protects the arms, and prevents dirt from getting under them, and consequently prevents clogging or limiting the movement of the said arms.

If found necessary, the drive-wheels B' can be provided with spikes or spurs, which will prevent them from slipping.

In a two-wheeled machine the front wheels, B, are entirely dispensed with, and the wheels B' placed nearer the center of the body, like any ordinary cart. The other parts are constructed and placed like those shown in the drawings, and operate in precisely the same manner.

It is evident that slight changes in the construction and arrangement of the different parts might be resorted to without departing from the spirit of my invention, and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. The combination, with a wagon or cart body, of an earth scraper or excavator pivotally connected with the rear end of said body, a lifting-chain actuated by moving the wagon forward, a drum over which the chain passes, and a clutch for throwing the drum in or out of movement, substantially as set forth.

2. The combination, with a wagon or cart body mounted on suitable drive-wheels, a drive-shaft secured to the said body, a rigid clutch, and a loose drum secured to said drive-shaft, a lever for operating the said drum, and chains connecting the said drive-wheels with the main shaft, of a scraper pivotally secured to the rear end of the machine-body, and a lifting-chain connecting the said scraper to the said driving-shaft.

3. The combination, with a wagon or cart body, driving-wheels provided on their inner faces with sprocket or spur wheels, and a scraper pivotally secured to the rear end of the wagon-body, of the driving-shaft, sprocket or spur loosely secured thereon by pawl-and-ratchet engagement, drive-chains connecting the said shaft to the drive-wheels, and a lifting-chain connecting the said scraper to the driving-shaft.

4. The combination, with a wagon or cart body mounted on suitable drive-wheels, of a scraper secured to the said body by the bent arms R, and provided with pins adapted to work in the oblong slots in the ends of the said arms, and means for elevating the said scraper.

5. The combination, with a wagon or cart body having a sectional hinged bottom, of the lever W, chain U, and pulleys $f$ $g$, located under the rear end of the body, whereby the chain passes beneath the bottom and extends forward at the side of the wagon-body, substantially as set forth.

6. The combination, with the body provided with the sectional bottom, chains for operating them, drive-wheels provided with spikes, and the sprocket-wheels rigidly secured to the said drive-wheels, of the drive-chains, drive-shaft, sprocket-wheels secured to the said shaft by ratchet-and-pawl engagement, the clutch, drum, and lever for operating the latter, the cross-beams with the guide-pulley secured thereon, the scraper pivotally secured to the body of the wagon or cart by the curved arms, and the lifting-chain connecting the bail of the scraper to the winding-drum, all of the above parts constructed and adapted to operate as described.

In testimony whereof I have signed this specification in the presence of two subscribing witnesses.

JOHN H. BARRINGER.

Witnesses:
CHAS. H. FOXWORTHY,
MILO CHASE.